United States Patent
Mazzara, Jr. et al.

(10) Patent No.: US 7,190,946 B2
(45) Date of Patent: Mar. 13, 2007

(54) IN-VEHICLE CLOCK SYNCHRONIZATION WITH LOCAL TIME

(75) Inventors: William E. Mazzara, Jr., Drayton Plains, MI (US); Timothy D. Lenane, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 574 days.

(21) Appl. No.: 10/310,224

(22) Filed: Dec. 5, 2002

(65) Prior Publication Data

US 2004/0203951 A1 Oct. 14, 2004

(51) Int. Cl.
*H04M 11/04* (2006.01)
(52) U.S. Cl. .................. 455/404.1; 455/414.1; 455/414.2; 455/95; 455/98; 455/99
(58) Field of Classification Search ............ 455/404.1, 455/414.1, 414.2, 414.3, 41.2, 95, 98, 99
See application file for complete search history.

(56) References Cited

U.S. PATENT DOCUMENTS

| 5,870,673 | A  | * | 2/1999  | Haartsen ............... 455/426.1 |
| 6,522,265 | B1 | * | 2/2003  | Hillman et al. ........... 340/988 |
| 6,882,912 | B2 | * | 4/2005  | Dilodovico et al. ......... 701/35 |
| 2001/0046872 | A1 | * | 11/2001 | Masuda .................. 455/502 |
| 2002/0140545 | A1 | * | 10/2002 | Nietupski ............... 340/5.72 |
| 2004/0028162 | A1 | * | 2/2004  | Skahan et al. ............ 375/356 |

* cited by examiner

*Primary Examiner*—Matthew Anderson
*Assistant Examiner*—Minh Dao
(74) *Attorney, Agent, or Firm*—Anthony Luke Simon

(57) ABSTRACT

The present invention is a system and method for providing local time to a mobile vehicle. A time information message is received at an in-vehicle telematics unit, which monitors for a time-update trigger event. A time-update message is sent from the telematics unit to a vehicle bus in response to the time-update trigger event. A computer usable medium with suitable computer program code is employed to provide local time to a mobile vehicle.

24 Claims, 2 Drawing Sheets

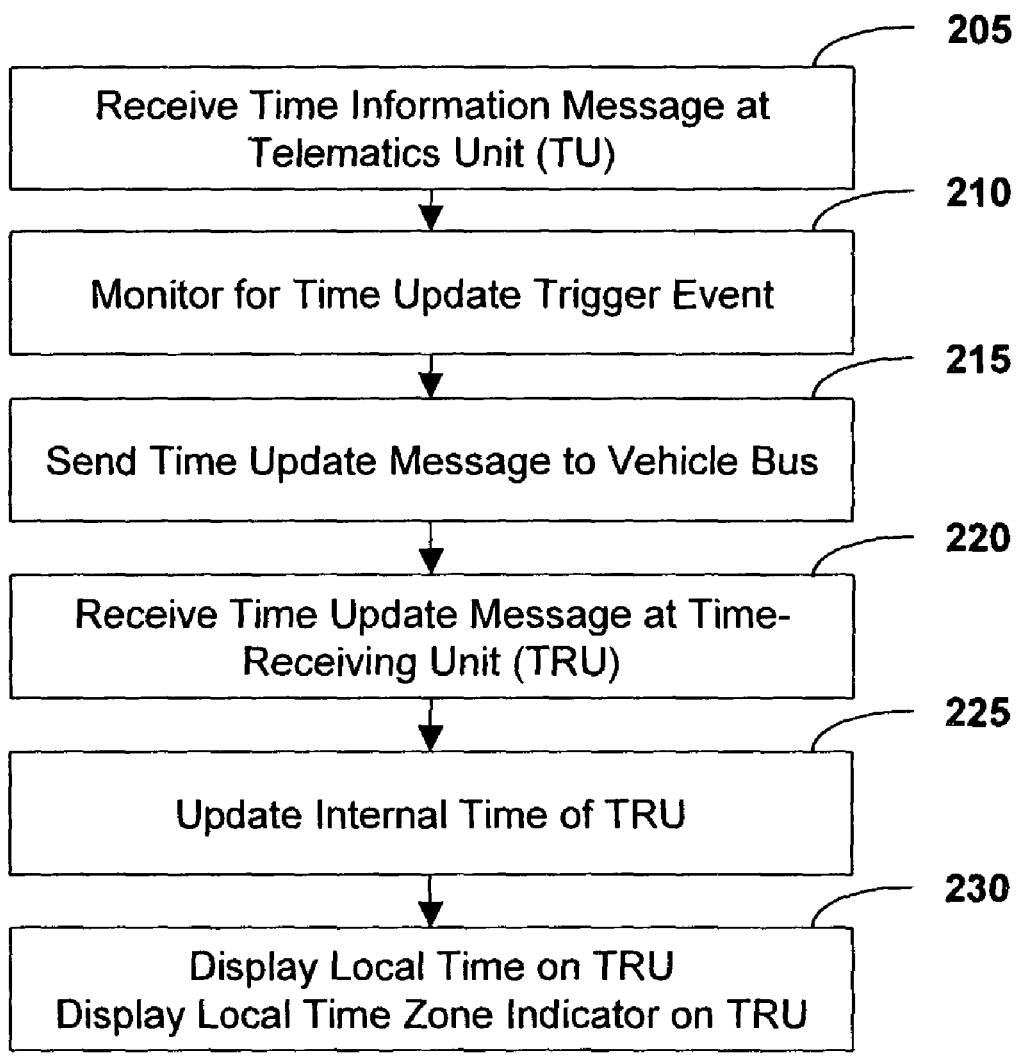

IN-VEHICLE CLOCK SYNCHRONIZATION WITH LOCAL TIME

FIELD OF THE INVENTION

This invention generally relates to providing local time to a mobile vehicle. In particular, the invention relates to a method and system for synchronizing a clock of an in-vehicle time-receiving device to the local time of a geographical area where the mobile vehicle is located.

BACKGROUND OF THE INVENTION

Currently, the local time setting of most in-vehicle clocks and clock radios need to be manually set each time, for example, the battery is disconnected, the vehicle enters into another time zone, or the local time is affected by changes to or from daylight savings time. The in-vehicle clocks need to be reset whenever the displayed time is out of synchronization with the local time setting. Several methods have been implemented to assist in setting of clocks and other time-sensitive modules in a vehicle to the local time.

One method in the last few years employs specialized radio receivers with clocks that use radio data system (RDS) technology. This technology allows radio broadcasters to silently deliver a 1,200 bits-per-second data stream on a subcarrier of a normal FM radio signal, with the data messaging typically modulated just above the stereo audio at 57 kHz. Information such as local radio time may be encoded on the FM subcarrier and transmitted from radio stations to specialized RDS receivers, which may periodically reset the car clock. It has been estimated that approximately 15 percent of the approximately 7,000 FM stations in the United States use RDS. Unfortunately, the time set by an RDS radio station is often dependent on the accuracy of a radio engineer's setting. Another minor problem has been differences between decoding displays of the European PTY (Program Type) decoding and the January 1998 US (January 1993 RBDS) decoding that U.S. radio stations typically use. FM radio sub-carrier time information used in determining local time requires additional software and hardware costs for an original equipment manufacturer (OEM) and is often not available on installed clock radios.

Another method for receiving local time in a vehicle uses Greenwich Mean Time (GMT) data broadcast from a global positioning system (GPS) and received by an in-vehicle GPS receiver. The time-stamp data, which cannot by itself provide local time, may use an algorithm that converts the Greenwich Mean Time (GMT) into local time. This algorithm, however, requires an additional source, such as a database of all geographical areas based on local coordinates and the time shifts of each geographical area with respect to GMT, to convert GMT into local time.

It is desirable, therefore, to provide a system and method that gives accurate local time to a vehicle and automatically synchronize an in-vehicle clock and other time-receiving devices with the local time, and to overcome the challenges and obstacles described above.

SUMMARY OF THE INVENTION

The present invention is a system and method for providing local time to a mobile vehicle. A time information message is received at an in-vehicle telematics unit, which monitors for a time-update trigger event. A time-update message is sent from the telematics unit to a vehicle bus in response to the time-update trigger event. The time-update message may be sent to and received at a time-receiving unit that is operably coupled to the vehicle bus, after which an internal time of the time-receiving unit may be updated based on the time-update message. The local time as well as a local-time zone indicator may be displayed on a time-receiving unit. A computer usable medium with suitable computer program code is employed to provide the local time to a mobile vehicle.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of one embodiment of a method to provide local time to a mobile vehicle, in accordance with the current invention.

DETAILED DESCRIPTION OF THE PRESENTLY PREFERRED EMBODIMENTS

Figure 1:
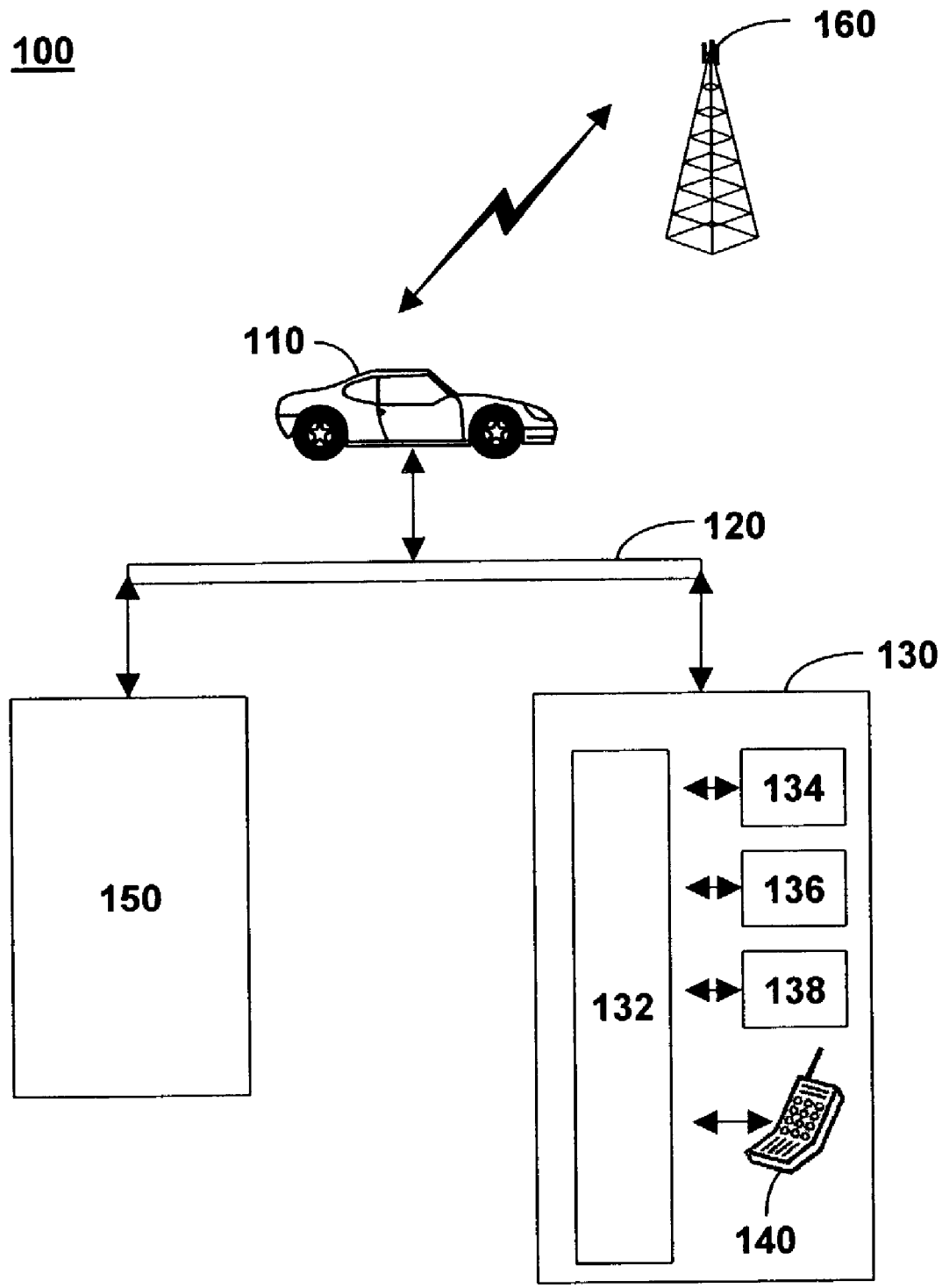
FIG. 1 is a schematic diagram of one embodiment of a system for providing local time to a mobile vehicle, in accordance with the current invention.

The present invention enables a vehicle to keep its radio clock and other time-receiving modules synchronized with a local time setting. An aspect of the invention is an improved process and system for providing local time to various time-sensitive devices in the vehicle, such as a clock radio, an infotainment device, and other time-receiving modules. The accuracy of the local time stamp can be one second or less. Local time zone shifts also are accommodated and an indication of the local time zone may be given on a display.

The invention leverages the current infrastructures of a wireless carrier communication system and an in-vehicle telematics unit, the latter communicating with various time-sensitive devices through the vehicle's communication bus. One embodiment of this invention provides a method and a system in which time synchronization does not depend on human interaction within the vehicle. It also allows an efficient use of available time information. An on-board real-time clock and associated buttons may be eliminated in lieu of an on-board display. The settings for local time can be quite accurate, because time settings received at a mobile vehicle are localized to each base transceiver station or cell-site tower of a wireless carrier system.

Another embodiment of the present invention provides that the devices may use a less expensive, reduced precision clock crystal or may be able to function without a crystal oscillator. Low-quality clocks, clock radios and other time-receiving modules that have low-grade crystal oscillators or use no crystal at all can remain accurate using regularly updated local time. The clock synchronization based on time information messages may virtually limit clock radio warranty work due to clock inaccuracy. Increased accuracy with a time-of-day clock may also decrease warranty work required for vehicle subsystems, such as a navigation system or a rear-entertainment system, which have clock displays that rely upon the time-of-day clock from the radio. Other electronic modules within the vehicle may store a time stamp to indicate periods of service, in-use time, or when a module was replaced.

FIG.1 illustrates one embodiment of a system for providing local time to a mobile vehicle, in accordance with the present invention at 100. Time provisioning system 100 includes a mobile vehicle 110, a vehicle communication bus 120, a telematics unit 130, one or more time-receiving units 150, and one or more wireless carrier systems 160. Mobile vehicle 110 may be a mobile vehicle equipped with suitable hardware and software for transmitting and receiving voice and data communications.

In an exemplary embodiment of this present invention, mobile vehicle 110 is equipped with a CDMA2000-enabled telematics unit, as referenced in IS-2000 standards. CDMA2000 provides the time along with other parameters using a logical synchronization channel. Alternative embodiments of the present invention may use a wireless carrier system protocol or other digital technologies such as IS-95 (CDMA) or IS-136 time division multiple access (TDMA), or Global System for Mobile Communications (GSM), the latter used primarily in Europe.

Vehicle communication bus 120 carries electronic communications between telematics unit 130, time-receiving units 150, and various other devices or modules that communicate electronic signals. Telematics unit 130 may be used to control electronic communications throughout the vehicle.

Telematics unit 130 may include a digital signal processor (DSP) 132 connected to a wireless modem 134, a global positioning system (GPS) unit 136, an in-vehicle memory 138, and an embedded or in-vehicle mobile phone 140. DSP 132 may also be referred to as a microcontroller, controller, host processor, or vehicle communications processor. Wireless modem 134, acting as a modulator/demodulator, transfers data between telematics unit 130 and a data-receiving device networked to wireless carrier system 160. GPS unit 136 provides longitude and latitude coordinates of the vehicle. In-vehicle mobile phone 140 may be an analog, digital, dual-mode, dual-band, multi-mode or multi-band cellular phone.

DSP 132 executes various computer programs that control programming and operational modes of electronic and mechanical systems within mobile vehicle 110. In this exemplary embodiment, DSP 132 controls functions of telematics unit 130. A program installed in DSP 132 may control the broadcasting of local time on the vehicle bus to various electronic or mechanical modules in a vehicle whose operations are affected by time units and changes in time.

DSP 132 may generate and accept digital signals transmitted between telematics unit 130 and various electronic modules and time-receiving units 150 in the vehicle. These digital signals may activate programming and operational modes, as well as provide for data transfers. DSP 132 controls and manages the configuration of telematics unit 130. DSP 132 may read and execute computer program code to configure and activate time-receiving units 150 from one or more computer programs for providing local time information to a mobile vehicle that are stored on any suitable computer usable medium such as programmable read-only memory (PROM), electrically-erasable programmable read-only memory (EEPROM), flash memory, compact disk (CD), digital video disk (DVD), or magnetic disks.

In-vehicle memory 138 may store a list of criteria for sending out local time updates through vehicle communication bus 120 to various electronic or mechanical modules that are impacted by clock settings. Some of the criteria include a time zone change, daylight savings time change, a Coordinated Universal Time (UTC) correction change, a daily adjustment time, a periodic adjustment time, or a predefined time to adjust for clock drift in any device hosting a clock element. Local time updates may be sent when it is detected that in-vehicle clocks are inaccurate or unsynchronized. Local time updates may be sent when power has been regained after a vehicle battery has been disconnected or has become dysfunctional.

Mobile vehicle 110 via telematics unit 130 sends and receives radio transmissions from wireless carrier system 160. Wireless carrier system 160 is any suitable system for transmitting a signal from mobile vehicle 110 to other communication and telephone networks. Wireless carrier system 160 may send a synchronization-channel message including a system time and a local time offset to in-vehicle mobile phone 140 embedded within telematics unit 130. Wireless carrier system 160 may contain suitable hardware and software capable of providing various communication services to wireless communication devices such as mobile phones and telematics units and in the network of the wireless carrier. Computer servers of wireless carrier system 160 may store other information including a local time setting, calling plan preferences, calling time allocations and configuration settings for telematics unit 130 and embedded mobile phone 140. Each cell of a wireless carrier system 160 keeps accurate local time, which is required for managing network traffic, billing and other business operations.

FIG. 2 is a flow diagram of one embodiment of a method of providing local time to a mobile vehicle, in accordance with the present invention at 200. Time provisioning method 200 begins with an in-vehicle telematics unit receiving a time information message from a wireless carrier system or a broadcast radio provider, as seen at block 205. The time information message may comprise a synchronization-channel message including a system time and a local time offset. The time information message may be broadcast in several different ways. The time information message may be broadcast from a terrestrial radio antenna by a radio broadcast system. The time information message may be broadcast on a control channel of a wireless service provider, which may be transmitted from a base transceiver station of the wireless service provider.

For example, each base transceiver station within a CDMA network broadcasts the local time, per CDMA standard IS-2000. CDMA time is represented as the GPS time received by the transceiver station, the UTC time correction, which accounts for inaccuracies in the GPS clock, the time zone adjustments relative to GMT, and a daylight savings time indicator to signify the locality in which the base station is operating is presently observing DST.

Alternatively, the time zone information may be received via the CDMA network and GPS time information received from the in-vehicle GPS unit. The time zone information may be combined with the GPS time information to provide accurate, time-zone referenced updates for in-vehicle clocks for cases where CDMA coverage is not available or it lapses. The previous time-zone information may be presumed to remain correct.

The telematics unit monitors for a time-update trigger event, as seen at block 210. The telematics unit may monitor the signals received from the vehicle bus, internal timing circuitry, an internal clock register, an embedded cell phone, or other electronic device. A time-update trigger event may be initiated by an electronic module of the vehicle, by receiving a communication from a call center, or by a scheduled or periodic programming event of the telematics unit itself. The time update trigger event may be a periodic trigger event, a predetermined time setting, a time-zone crossing event, a mobile vehicle ignition event, a time update request, a power restoration event, or an unsynchronized clock determination. The time information may be broadcast (pushed) onto the vehicle bus or requested (pulled) by an in-vehicle time-receiving unit. Some of the reasons for updating the time include a restoration of battery power, the vehicle crossing a time zone, daylight savings time change, UTC correction change, or a regimented schedule each day or at a predefined time to adjust for clock drift in the device that hosts the clock. In the case of a scheduled time update, the time interval between synchronization times may be determined by the accuracy of the crystal oscillator in the time-of-day clock. When triggered, the time-synchronization information, also known as the time-update message, may be sent over the vehicle communication bus. A determination may be made if any of the in-vehicle clocks are out of synchronization with the actual time, and a time-update trigger generated when the determination has been made.

After the telematics unit detects a time-update trigger event, the telematics unit may send a time-update message to a vehicle bus in response to the time-update trigger event, as seen at block 215. The time-update message may include the local time, as well as optional local time zone and date indicators. The telematics unit may have a set of broadcast conditions that must be met before broadcasting a time-update message, to avoid overloading the vehicle communication bus with too much data traffic. When the broadcast conditions are met, the time-update message may be sent. The message may include the current local time, name of local time zone, and current date.

The time-update message may be received at one or more time-receiving units that are operably coupled to the vehicle communication bus, as seen at block 220. Examples of the time-receiving unit are an in-vehicle clock, a vehicle clock radio, an infotainment system, an in-vehicle entertainment unit, a vehicle electronic module, or any device in the vehicle that features a clock or can utilize accurate readings of local time.

An internal time of the time-receiving unit may be updated based on the time-update message, as seen at block 225. A time-receiving unit may be suitably equipped with hardware and software to receive and recognize the time-update message, and update its internal clock time with the updated time included in the time-update message.

The updated local time may be displayed on a time-receiving unit that is operably coupled to the vehicle bus, as seen at block 230. In an exemplary embodiment of the present invention, the mobile vehicle is equipped with a clock radio that may display the updated local time. The clock radio may also display a local time zone indicator with its associated acronym, for examples, PST for Pacific Standard Time or EDT for Eastern Daylight Time. The clock radio may display more accurate time readings, such as seconds or even decimal fractions of a second. Other in-vehicle units may display the updated local time, such as an in-vehicle infotainment system. An in-vehicle clock radio or any other device that uses the local time updates can be preprogrammed to receive the time broadcast and to update its internal clock accordingly. Some time-receiving units may allow for a user to offset a time setting per a user preference. For example, a driver may wish to set the time of vehicle clock two minutes ahead of actual time.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for providing local time to a mobile vehicle, comprising:
   periodically receiving a time information message at an in-vehicle telematics unit;
   updating a time setting of a mobile phone utilized by the in-vehicle telematics unit based on the time information message;
   monitoring for a time-update trigger event that occurs with a different frequency than said time information message; and
   sending a time-update message from the telematics unit to a time-receiving unit over a vehicle bus in response to the time-update trigger event.

2. The method of claim 1 wherein the time information message comprises a synchronization channel message including a system time and a local time offset.

3. The method of claim 1 wherein the time information message is received via control channel of a wireless service provider.

4. The method of claim 1 wherein the time information message is broadcast from a terrestrial radio antenna.

5. The method of claim 1 wherein the time-update trigger event is selected from the group consisting of a periodic trigger event, a predetermined time setting, a time-zone crossing event, a mobile vehicle ignition event, a time-update request, a power restoration event, and an unsynchronized clock determination.

6. The method of claim 1 wherein the time-update message includes the local time.

7. The method of claim 1 wherein the time-update message includes a local time zone indicator.

8. The method of claim 1 wherein the time-update message includes a date indicator.

9. The method of claim 1 further comprising:
   updating an internal time of the at least one time-receiving unit based on the time-update message.

10. The method of claim 9 wherein the at least one time-receiving unit is selected from the group consisting of an in-vehicle clock, a vehicle clock-radio, an infotainment system, an in-vehicle entertainment unit, and a vehicle electronic module.

11. The method of claim 1 further comprising:
    displaying the local time on a time-receiving unit operably coupled to the vehicle bus.

12. The method of claim 11 further comprising:
    displaying a local time zone indicator on the time-receiving unit.

13. A method for providing local time to devices on a mobile vehicle, comprising:
    receiving, at a telematics unit on the mobile vehicle, time information messages transmitted by a wireless cellular network over a control channel of the cellular network;
    updating a mobile phone associated with the in-vehicle telematics unit based on the time information message;
    monitoring the time information message for an indication of a time zone change applicable to the mobile vehicle; and
    updating a time setting of at least one time-receiving unit on the mobile vehicle based on the time information message in response to the time zone change.

14. The method of claim 13 wherein the time information message comprises a synchronization channel message including a system time and a local time offset.

15. The method of claim 13 further including the steps of:
monitoring the time information message for an indication of a daylight savings time change applicable to the mobile vehicle; and
updating an internal time of at least one time-receiving unit on the mobile vehicle based on the time information message in response to the daylight savings time change.

16. The method of claim 13 wherein the at least one time-receiving unit is selected from the group consisting of an in-vehicle clock, a vehicle clock-radio, an infotainment system, an in-vehicle entertainment unit, and a vehicle electronic module.

17. The method of claim 13 wherein the step of updating a time setting of at least one time-receiving unit includes broadcasting a time-update message including local time information and a time zone indicator over a vehicle bus to the time-receiving unit on the vehicle.

18. The method of claim 13 wherein the mobile phone comprises a cellular phone embedded in the telematics unit.

19. A method for providing local time to devices on a mobile vehicle, comprising:
receiving, at a telematics unit on the mobile vehicle, periodic time information messages transmitted by a wireless cellular network over a control channel of the cellular network, the time information message having a time setting for a predetermined time zone and local time zone information;
updating a mobile phone in the in-vehicle telematics unit each time one of the time information messages are received;
monitoring the local time zone information in the messages to detect a time zone change applicable to the mobile vehicle; and
updating an internal time on a clock-radio on the mobile vehicle in response to detecting the time zone change in accordance with the time zone change.

20. The method of claim 19 wherein the mobile phone comprises a cellular phone embedded in the telematics unit.

21. The method of claim 19 wherein the predetermined time zone is Greenwich Mean Time and the local time zone information comprises an offset from the Greenwich Mean Time.

22. The method of claim 19 wherein the step of updating the internal time of the radio clock includes the step of:
sending a time-update message including local time information and a time zone indicator over a vehicle bus to the clock-radio on the vehicle.

23. The method of claim 22 wherein the time-update message includes a date indicator.

24. The method of claim 22 wherein the time-update message includes a daylight savings time indicator.

* * * * *